United States Patent
Li et al.

(10) Patent No.: US 12,278,671 B2
(45) Date of Patent: Apr. 15, 2025

(54) CHANNEL IDENTIFICATION METHOD AND APPARATUS, TRANSMISSION METHOD, TRANSMISSION DEVICE, BASE STATION, AND MEDIUM

(71) Applicant: ZTE Corporation, Shenzhen (CN)

(72) Inventors: Jianguo Li, Shenzhen (CN); Qiaoyan Liu, Shenzhen (CN); Kai Mao, Shenzhen (CN); Ting Miao, Shenzhen (CN); Ke Shi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 400 days.

(21) Appl. No.: 17/788,023

(22) PCT Filed: Dec. 15, 2020

(86) PCT No.: PCT/CN2020/136508
§ 371 (c)(1),
(2) Date: Jun. 22, 2022

(87) PCT Pub. No.: WO2021/129464
PCT Pub. Date: Jul. 1, 2021

(65) Prior Publication Data
US 2023/0034994 A1    Feb. 2, 2023

(30) Foreign Application Priority Data
Dec. 24, 2019 (CN) .......................... 201911348223.6

(51) Int. Cl.
*H04B 17/40* (2015.01)
*H04B 17/391* (2015.01)

(52) U.S. Cl.
CPC ............................. *H04B 17/3913* (2015.01)

(58) Field of Classification Search
CPC ....... H04B 17/3913; G01S 11/02; G06N 5/01; G06N 20/00
See application file for complete search history.

(56) References Cited

U.S. PATENT DOCUMENTS

| | | | |
|---|---|---|---|
| 2015/0153380 A1* | 6/2015 | Elhoushi | G01C 21/188 702/141 |
| 2019/0277957 A1* | 9/2019 | Chandrasekhar | G01S 5/017 |

FOREIGN PATENT DOCUMENTS

| | | |
|---|---|---|
| CN | 102025680 A | 4/2011 |
| CN | 102740318 A | 10/2012 |

(Continued)

OTHER PUBLICATIONS

International Search Report for corresponding application PCT/CN2020/136508 filed Dec. 15, 2020; Mail date Mar. 4, 2021.

(Continued)

*Primary Examiner* — Fayyaz Alam
(74) *Attorney, Agent, or Firm* — CANTOR COLBURN LLP

(57) ABSTRACT

Provided is a channel identification method. The method includes: acquiring channel data of a terminal; constructing a first feature vector based on the channel data, where the first feature vector represents a numerical value set of cross-correlation values, which change along with time intervals, between channel data at different moments and the channel data themselves and between the channel data at different moments and subsequent channel data at different time intervals; and inputting the first feature vector into a predetermined prediction model to predict a speed of the terminal, or to predict a speed type of a cluster to which the terminal belongs. Further provided are an adaptive transmission method and apparatus based on the channel identification method, a transmission device, a base station, and a computer storage medium.

19 Claims, 4 Drawing Sheets

(56) References Cited

FOREIGN PATENT DOCUMENTS

| CN | 102892152 A | 1/2013 |
| CN | 104853367 A | 8/2015 |
| CN | 110197251 A | 9/2019 |
| WO | 2011130997 A1 | 10/2011 |
| WO | 2019172639 A1 | 9/2019 |

OTHER PUBLICATIONS

European Search Report for corresponding application EP 20 90 4906; Report dated May 24, 2023.

* cited by examiner

CHANNEL IDENTIFICATION METHOD AND APPARATUS, TRANSMISSION METHOD, TRANSMISSION DEVICE, BASE STATION, AND MEDIUM

CROSS-REFERENCE TO RELATED APPLICATION

The present disclosure is a National Stage Filing of the PCT International Application No. PCT/CN2020/136508 filed on Dec. 15, 2020, which is based on and claims priority to Chinese Patent Application No. 201911348223.6 filed on Dec. 24, 2019, the entirety of which is herein incorporated by reference.

TECHNICAL FIELD

The present disclosure relates to the technical field of communications, and in particular to a channel identification method and apparatus, an adaptive transmission method and device, a base station, and a computer-readable storage medium.

BACKGROUND

For the 5th Generation Mobile Communication Technology (5G), orthogonality between multi-user channels is achieved and spatial domain resources are fully utilized by means of the application of Massive Multi-Input Multi-Output (MIMO) technology, thereby improving spectrum efficiency. However, the Massive MIMO technology raises a high demand for identification of user mobility, the objective of which is to identify users in different mobile states.

The conventional solution to high-resolution speed measurement is implemented based on a Rayleigh channel, and has a problem of low accuracy.

SUMMARY

Embodiments of the present disclosure provide a channel identification method and apparatus, an adaptive transmission method and device, a base station, and a computer-readable storage medium.

The embodiments of the present disclosure provide a channel identification method, including: acquiring channel data of a terminal; constructing a first feature vector based on the channel data, where the first feature vector represents a numerical value set of cross-correlation values, which change along with time intervals, between channel data at different moments and the channel data themselves and between the channel data at different moments and subsequent channel data at different time intervals; and inputting the first feature vector into a predetermined prediction model to predict a speed of the terminal, or to predict a speed type of a cluster to which the terminal belongs.

The embodiments of the present disclosure provide an adaptive transmission method, used for carrying out adaptive transmission according to the speed of the terminal or the speed type of the cluster to which the terminal belongs, which is obtained by the above channel identification method.

The embodiments of the present disclosure provide a channel identification apparatus, including an acquisition module, a construction module and a prediction module, where the acquisition module is configured to acquire channel data of a terminal; the construction module is configured to construct a first feature vector based on the channel data acquired by the acquisition module, where the first feature vector represents a numerical value set of cross-correlation values, which change along with time intervals, between channel data at different moments and the channel data themselves and between the channel data at different moments and subsequent channel data at different time intervals; and the prediction module is configured to input the first feature vector constructed by the construction module into a predetermined prediction model to predict a speed of the terminal, or to predict a speed type of a cluster to which the terminal belongs.

The embodiments of the present disclosure provide an adaptive transmission device, including the above channel identification apparatus, and a transmission apparatus, where the transmission apparatus is configured to carry out adaptive transmission according to the speed of the terminal or the speed type of the cluster to which the terminal belongs.

The embodiments of the present disclosure provide a base station, including a memory and a processor, where the memory stores an instruction, and the processor runs the instruction to execute the above channel identification method.

The embodiments of the present disclosure provide a computer-readable storage medium, storing a computer program, where the computer program, when executed, implements the above channel identification method.

DETAILED DESCRIPTION

In order to make those having ordinary skill in the art better understand the technical solution of the embodiments of the present disclosure, a channel identification method and apparatus, an adaptive transmission method and device, a base station, and a computer-readable storage medium of the embodiments of the present disclosure are described in detail below in conjunction with drawings.

Figure 1:
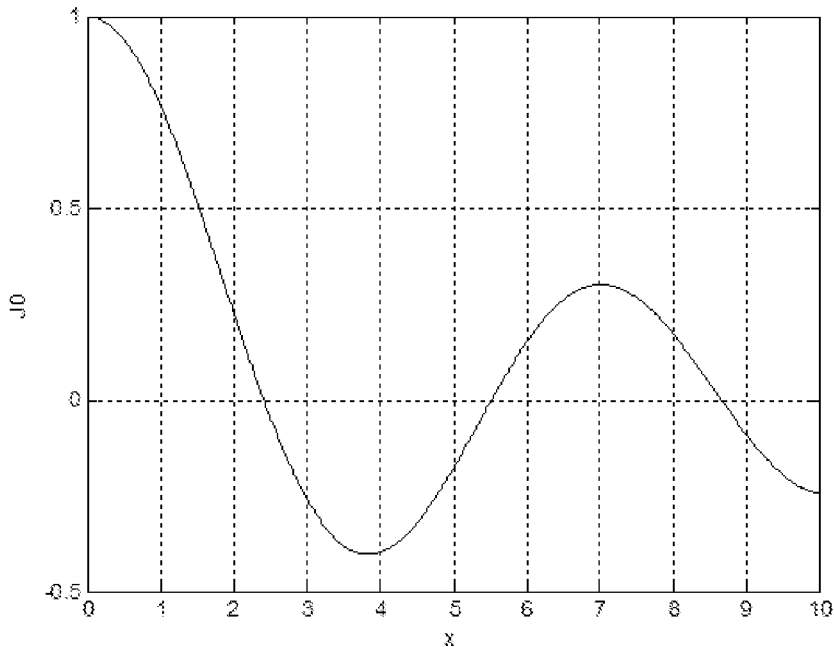
FIG. 1 is a diagram of a first-class 0-order Bessel function.

Currently, a Rayleigh channel based speed measurement technology estimates a speed of a mobile terminal according to the following model (1):

$$r_h(\tau) = E\{h(t)h^*(t+\tau)\} \qquad (1)$$
$$= E\{h(t)h^*(t)\}J_0(2\pi f d\tau)$$

where h is a channel response, $J_0$ is a first-type zero-order Bessel function, as shown in FIG. 1, fd is a maximum Doppler frequency, τ is a channel cross-correlation time interval, and t is a sampling moment of a channel.

Owing to inspiration of the above model, whether a speed is higher or lower than a given threshold is determined by computing an autocorrelation value of channel data of a user and a cross-correlation value under a certain delay and according to a relation between the autocorrelation value and the cross-correlation value. However, only two speed types can be identified, and the resolution is low. A high-resolution speed measurement solution appears later, but it is still a Rayleigh channel based speed measurement technology, that is, speed measurement is carried out in a scene with a non-direct sight path. In an actual communication network, non-direct sight path scenes are far less than mixed scenes, that is, energy of the direct sight path has a certain proportion, and when power proportion of the direct sight path is great, the cross-correlation value is slowly attenuated or even not attenuated along with a change of a correlation time interval.

Aiming at the above situation, the specific idea of the embodiments of the present disclosure is as follows. A curve in which the cross-correlation value of the channel is changed along with a change of the correlation time interval exists at each movement speed under each frequency point. When the speed is different, the curve is different, and the speed influences a change speed of the curve. When the speed is low, correlation is high, and the curve is changed slowly. When the speed is high, correlation is low, and the curve is changed rapidly. The curve is different when power proportion (Rician factor) of the direct sight path is different, and the power proportion of the direct sight path influences amplitude distribution of the curve. When the power proportion of the direct sight path is great, the amplitude distribution of the curve is high. When the power proportion of the direct sight path is small, the amplitude distribution of the curve is low. Therefore, it is only needed to construct a corresponding change curve to serve as a feature vector, or to classify the feature vector, which is the classification of the speed and the classification of the power proportion of the direct sight path.

In addition, both speed and Rician factor (power proportion of direct sight path) are characteristics of the channel, for example, channel characteristics of high speed, medium speed, or low speed. Therefore, identification of the speed and/or Rician factor is identification of the channel.

Embodiment 1

Figure 2:
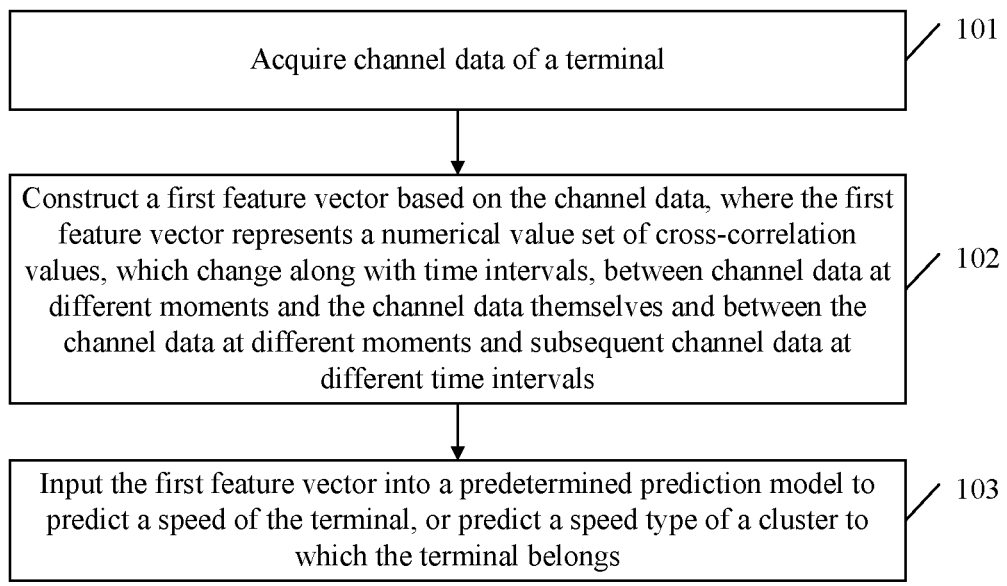
FIG. 2 is a flow chart of a channel identification method of an embodiment of the present disclosure.

As shown in FIG. 2, this embodiment provides a channel identification method. The method is applied to a network side, for example, may be applied to a base station, and can identify movement speeds and/or Rician factors of a terminal. The terminal may be an electronic apparatus having a call function, such as a mobile phone, a telephone watch, an in-vehicle computer, etc. The method includes the following operations.

At operation 101, channel data of a terminal is acquired.

In this embodiment, the channel data of the terminal of which the movement speed is to be measured is acquired. The channel identification method may be applied to one or more terminals. When the channel identification method is applied to a plurality of terminals, the plurality of terminals belong to the same cell. The acquired channel data of the terminal includes channel data in a time domain or a frequency domain, for example, the acquired channel data of the terminal is represented as $H=\{[h_0, h_1, h_2, \ldots, h_N]_i | i=1, 2, \ldots, M\}$, where $[h_0, h_1, h_2, \ldots h_N]_i$ represents real data of channel data, aligned in the frequency domain, of the i-th terminal in N continuous subframes. It should be noted that since the channel has frequency selection characteristics, if the channel is not aligned, subsequently computed correlations will be influenced by the frequency selection characteristics (i.e., channel latency), thereby influencing accuracy of speed measurement. Meanwhile, the channel data includes frequency point information.

At operation 102, a first feature vector is constructed based on the channel data of the terminal, where the first feature vector represents a numerical value set of cross-correlation values, which change along with time intervals, between channel data at different moments and the channel data themselves and between the channel data at different moments and subsequent channel data at different time intervals.

Specifically, a first feature matrix is constructed based on frequency domain data of each piece of channel data (one terminal only corresponds to one piece of channel data in a certain small time period), and each row of the first feature matrix includes expected values of cross-correlation values between frequency domain channel data at different moments and the frequency domain data themselves and between the frequency domain channel data at different moments and subsequent frequency domain channel data at different time intervals. A mean value of effective values of each column of the first feature matrix is computed as a row value of the first feature vector so as to obtain the first feature vector. If the acquired channel data is time domain data, the time domain data is converted into frequency domain data, which is then used to construct the first feature matrix.

In this embodiment, one first feature matrix is correspondingly constructed based on channel data of each terminal, and the first feature matrix is represented by expression (2):

$$V_i = \begin{bmatrix} E(h_0 * h_0^H), & E(h_0 * h_1^H), & E(h_0 * h_2^H), & \ldots, & E(h_0 * h_{N-1}^H), & E(h_0 * h_N^H) \\ E(h_1 * h_1^H), & E(h_1 * h_2^H), & E(h_1 * h_3^H), & \ldots, & E(h_1 * h_N^H), & Null \\ E(h_2 * h_2^H), & E(h_2 * h_3^H), & E(h_2 * h_4^H), & \ldots, & Null, & Null \\ \vdots & & & \ddots & & \vdots \\ E(h_{N-1} * h_{N-1}^H), & E(h_{N-1} * h_N^H), & Null, & \ldots, & Null, & Null \\ E(h_N * h_N^H) & , Null & , Null, & \ldots, & Null, & Null \end{bmatrix}_i \quad (2)$$

where $i=1, 2, \ldots, M$, $h_0^H$ is a conjugate of $h_0$, correspondingly, $h_N^H$ is a conjugate of $h_N$, $(h_0*h_0^H)$ represents multiplication of two scalars, E represents an expected value or a mean value, and Null represents null or an invalid value.

The first feature vector is constructed according to the first feature matrix $V_i$, $(i=1, 2, \ldots, M)$ of the i-th terminal, and the first feature vector is expressed by expression (3):

$$\alpha^i = [\alpha_0^i, \alpha_1^i, \ldots, \alpha_N^i] \quad (3).$$

The first feature vector represents a numerical value set of cross-correlation values, which change along with time intervals, between channel data at different moments and the channel data themselves and between the channel data at different time moments and subsequent channel data at different time intervals. The numerical value set describes a curve of channel cross-correlation changing along with correlation time intervals, where $\alpha_t^i$ in expression (3) represents a mean value (t=0, 1, ..., N) of effective values of the t-th column of the first feature matrix $V_i$.

At operation 103, the first feature vector is inputted into a predetermined prediction model to predict a speed of the terminal, or to predict a speed type of a cluster to which the terminal belongs. Herein, the speed refers to a movement speed.

In an implementation, before inputting the first feature vector into the predetermined prediction model, the method further includes the following operations. A model library which stores prediction models under different frequency points is established, where the prediction models are functions the feature vector.

A prediction model corresponding to a frequency point of the terminal is selected from the model library as the predetermined prediction model.

In this embodiment, one or more of the prediction models in the model library may correspond to the frequency point of the terminal, the number of the prediction models is related to the model library, and the model library is related to model training criteria. When a plurality of prediction models are selected from a certain model library, one prediction model having optimal performance under the frequency point may be selected according to user needs and may be used for predicting the speed of the terminal or predicting the speed type of the cluster to which the terminal belongs. When a plurality of prediction models under the frequency point are selected, the prediction models may be used for predicting the speed type of the cluster to which the terminal belongs, that is, predicting the speed type of the terminal. A specific selection method is described in details in the following embodiments.

Establishment of the model library is related to the model training criteria. Considering that there are two model training criteria in the following implementations, in which the model library includes a first model library and/or a second model library, establishment processes of the first model library and the second model library will be disclosed below.

Figure 3:
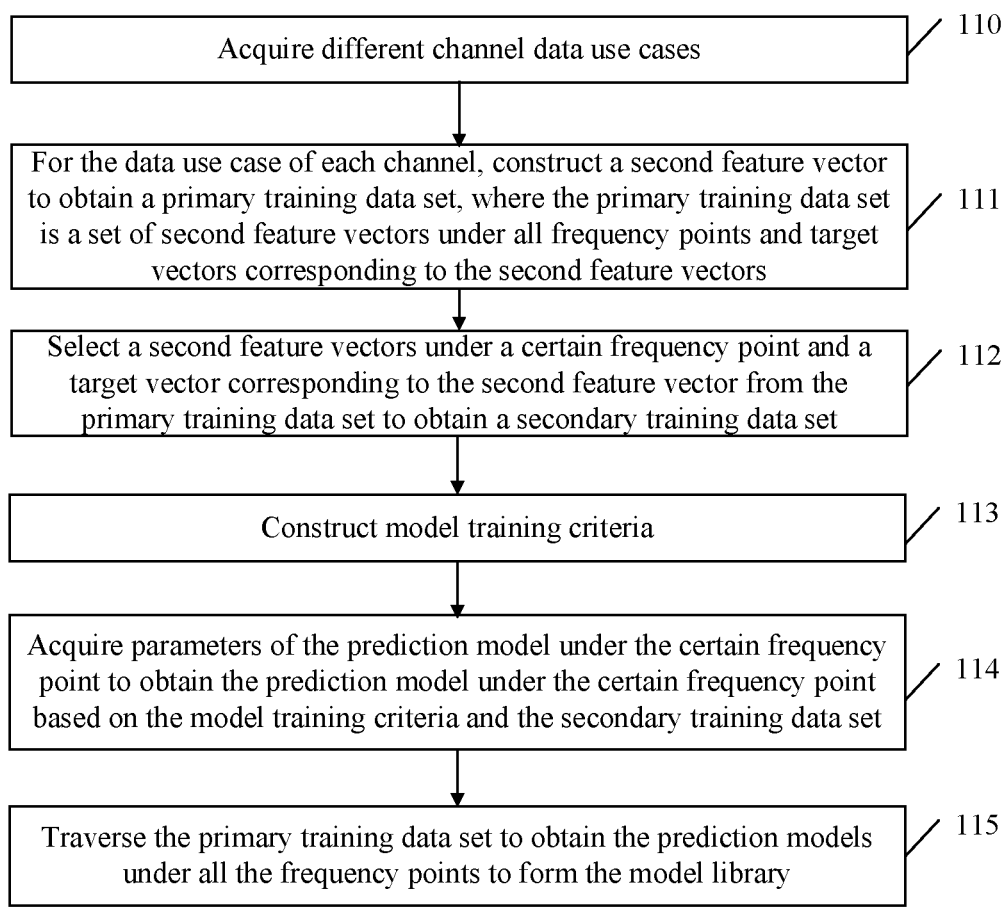
FIG. 3 is a flow chart of a method for establishing a model library of a channel identification method of an embodiment of the present disclosure.

In an implementation, as shown in FIG. 3, the operation of establishing the first model library includes the following operations.

At operation 110, different channel data use cases are acquired.

In this embodiment, on the basis a system simulation platform or a laboratory channel simulator or an outfield commercial scene having configurable channel parameters, small-scale data (where the small-scale data is channel data and includes channel data in a time domain or a frequency domain) under various target speeds are acquired, and the channel data acquired in operation 110 is described by the following expression: $H=\{[h_0, h_1, h_2, \ldots, h_N]_i | i=1, 2, \ldots, M\}$, and a corresponding target vector is: $H_{tar}=\{[v_1] | i=1, 2, \ldots, M\}$, where $[h_0, h_1, h_2, \ldots, h_N]_i$ represents real data of channel data, aligned in the frequency domain, of the i-th use case in N continuous subframes, $[v_i]$ represents a target speed of the i-th use case, and frequency point information $f_c$ corresponding to the i-th channel use case is recorded. It should be noted that when the small-scale data at various target speeds are acquired, various different Rician factors may be configured. When the Rician factors are configured to be 0, small-scale data under various target speeds are acquired, and the acquired data use cases of the channel are in non-direct sight path scenes. When the Rician factors are configured not to be 0, small-scale data under various target speeds are acquired, and the acquired data use cases of the channel are in mixed scenes having a certain proportion of direct sight path.

In order to ensure comprehensiveness and integrity of the acquired channel data use cases, the channel data use cases under different target speeds under common frequency points are usually acquired.

At operation 111, for each channel data use case, a second feature vector is correspondingly constructed to obtain a primary training data set, where the second feature vector represents a numerical value set of cross-correlation values, which change along with time intervals, between channel data at different moments and the channel data themselves and between the channel data at different moments and subsequent channel data at different time intervals, and the primary training data set includes a set of second feature vectors under all frequency points and target vectors corresponding to the second feature vectors.

In this embodiment, the second feature vector may be constructed in the same mode as the first feature vector. That is, the second feature matrix is constructed based on frequency domain data of each channel data use case, where the second feature matrix may be expressed by expression (2), that is, each row of the second feature matrix includes expected values of cross-correlation values between frequency domain channel data at different moments and the frequency domain data themselves and between the frequency domain channel data at different moments and subsequent frequency domain channel data at different time intervals. The second feature vector is constructed according to the above second feature matrix $V_i$ (i=1, 2, ..., M), and the second feature vector may be expressed by expression (3), i.e., $\alpha^i=[\alpha_0^i, \alpha_1^i, \ldots, \alpha_N^i]$, and a construction method is as described in operation 102, where $\alpha_t^i$ represents a mean value (t=0, 1, 2, ..., N) of effective values of the t-th column of the second feature matrix $V_i$.

A set of the second feature vectors and the target vectors is acquired as follows:

$$A=\{(\alpha^i, \alpha_{tar}^i) | i=1, 2, \ldots, M\}, \alpha_{tar}^i=[v_i]$$

The set constitutes a primary training data set, where the target vectors include target speeds, that is, the target vector $[v_i]$ represents the target speed corresponding to the second feature vector of the i-th use case.

At operation 112, a second feature vector under a frequency point and a target vector corresponding to the second feature vector are selected from the primary training data set to obtain a secondary training data set.

In this embodiment, according to frequency point information corresponding to the channel data use cases, the data set under the same frequency point is selected from the primary training data set to obtain the secondary training data set: $T=\{(\alpha^j, \alpha_{tar}^j) | j \in B\}$. The secondary training data set includes second feature vectors and target vectors corresponding to the second feature vectors, the target vectors including target speeds. Therefore, T is a subset of A, i.e., T represents a set of the second feature vectors corresponding to different target speeds under the same frequency point and the target speeds, B represents a data index set corresponding to frequency points, and j is a variable in B.

At operation 113, model training criteria is constructed.

The operation of constructing the model training criteria includes: an expression for an error function is established as follows:

$$Err = \sum_{j \in B} (|v_j - f(\alpha^j, \overline{w})|)^2, \quad (4)$$

where Err is an error, $v_j$ is the target speed, $\alpha^j$ is the second feature vector, $f(\alpha^j, \overline{w})$ is a speed prediction model, B represents a data index set corresponding to the frequency points, j is a variable in B, and $\overline{w}$ is a weight parameter.

At operation 114, parameters of the prediction model under the certain frequency point are acquired based on the model training criteria and the secondary training data set so as to obtain a prediction model under a certain frequency point.

In this embodiment, for established error function expression (4), the speed prediction model may be acquired by means of classical model training operators (for example, operators of a regression algorithm, a neural network, a support vector machine, etc.). For example, the target speed is input into error function expression (4), and is substituted into the second feature vector $\alpha^j$ corresponding to the target speed at a certain frequency point to acquire a weight vector, i.e., $$\overline{w} = \arg\min_{\overline{w}}(Err) = \arg\min_{\overline{w}} \left( \sum_{j \in B} (|v_j - f(\alpha^j, \overline{w})|)^2 \right) \quad (4-1)$$

so as to obtain $\overline{w}$, thereby further obtaining the speed prediction model under the frequency point, and the obtained speed prediction model is a model about feature vectors and speeds, where the feature vectors are input values of the speed prediction model, and the speeds are output values, where arg min represents a variable value when an objective function is minimized. The model training criteria in this embodiment only consider supervised learning of the target speed, the frequency points acquired in this embodiment are in one-to-one correspondence with the speed prediction models, that is, one speed prediction model corresponds to one frequency point.

At operation 115, the primary training data set is traversed to obtain prediction models under all frequency points to form a first model library.

An application range of the model library may be wider by obtaining the prediction models under all the frequency points, that is, the speed prediction models in the first model library acquired according to error function expression (4) can predict movement speeds or speed types of terminals in many different cells.

In another embodiment, the operation of establishing the second model library includes the following operations.

At operation 120, different channel data use cases are acquired. Specifically, on the basis a system simulation platform or a laboratory channel simulator or a outfield commercial scene having configurable channel parameters, small-scale data under various target speeds and various target Rician factors (the Rician factor represents a ratio of direct sight path power to non-direct sight path power) is acquired, and the channel data is described by the following expression: $H=\{[h_0, h_1, h_2, \ldots, h_N]_i | i=1, 2, \ldots, M\}$, and a corresponding target vector is: $H_{tar}=\{[v_i, \kappa_i] | i=1, 2, \ldots, M\}$, where $[v_i, \kappa_i]$ represents a target vector of the i-th use case, the target vector includes a target speed and a target Rician factor, and frequency point information $f_c$ corresponding to the i-th channel use case is recorded. In order to ensure comprehensiveness and integrity of the acquired channel data use cases, the channel data use cases under different target speeds and different target Rician factors under common frequency points are usually acquired. The operation 110 differs from operation 120 in that operation 110 does not record a value of a Rician factor configured when the channel data use case is acquired, such that the target vector acquired in operation 110 only includes the target speed, and supervised learning of a target Rician factor is not considered in the subsequent model training criteria.

At operation 121, for each channel data use case, a second feature vector is constructed. A construction method is as described in the operation 111, and a set of the second feature vectors and the target vectors are acquired as follows:

$$A=\{(\alpha^i, \alpha_{tar}{}^i)|i=1, 2, \ldots, M\}, \alpha_{tar}{}^i=[v_i, \kappa_i]$$

The set constitutes the primary training data set, where the target vectors include the target speeds and the target Rician factors, and the target vector $[v_i, \kappa_i]$ represents the target speed and the target Rician factor corresponding to the second feature vector of the i-th use case.

At operation 122, the second feature vector and the target vector corresponding to the second feature vector under a certain frequency point are selected from the primary training data set to obtain a secondary training data set: $T=\{(\alpha^j, \alpha_{tar}{}^j)|j \in B\}$, where T represents a set of the second feature vectors and the target vectors corresponding to different target speeds and different target Rician factors under the same frequency point, B represents a data index set corresponding to the frequency points, and j is a variable in B.

At operation 123, model training criteria is constructed, which includes: establishing an expression for an error function:

$$Err = \sum_{j \in B} ((|v_j - f(\alpha^j, \overline{w})|)^2 + \alpha * (|\kappa_j - g(\alpha^j, \hat{w})|)^2), \quad (5)$$

where Err is an error, $v_j$ is the target speed, $\kappa_j$ is the target Rician factor, $\alpha^j$ is the second feature vector, B is a data index set corresponding to frequency points, j is a variable in B, and f (•, $\underline{w}$) and g(•, $\hat{w}$) may represent a linear regression, or a neural network, etc., where f ($\alpha^j$, $\overline{w}$) is a speed prediction model, g($\alpha^j$, $\hat{w}$) is a Rician factor prediction model, $\alpha$ is an overrunning parameter, a value range is $0 \leq \alpha \leq 1$, and $\overline{w}$ and $\hat{w}$ are weight parameters.

Error function (5) established in this embodiment converts a multi-objective (for example, two objectives of a speed and a Rician factor) optimization problem into a single-objective optimization problem by introducing the overrunning parameter (a proportion of each component of a multi-objective error function vector in a single-objective error function). $\alpha$ represents a compromise factor of multiple objectives, i.e., the overrunning parameter, and the corresponding prediction model has differences when the overrunning parameter is different, where $\alpha \in [0, 1]$. When $\alpha=1$, the corresponding model training criteria consider supervised learning of the target speed and the target Rician factor in a balanced mode, even if the supervised learning of the target speed and the target Rician factor each account for 50% of the error function. An actual communication network is a mixed scene in many cases, energy of the direct sight path has a certain proportion, and when power proportion of the direct sight path is great, a curve of the cross-correlation values changing along with time intervals is influenced. The speed prediction model obtained in this embodiment considers influence under the Rician factor due to error function (5), such that the speed value or the speed type predicted obtained by using the speed prediction model is closer to actual channel characteristics, and therefore, accuracy of predicted data is higher.

At operation 124, parameters of the prediction model under the certain frequency point are acquired based on the model training criteria and the secondary training data set so as to obtain the prediction model under the certain frequency point.

Specifically, for established error function expression (5), according to different set values of the overrunning parameter, the speed prediction model and the Rician factor prediction model may be acquired by means of classical model training operators (for example, operators of a regression algorithm, a neural network, a support vector machine, etc.), for example, the target speed, the target Rician factor and the set overrunning parameter are input into error function expression (5), and are substituted into the second feature vector $\alpha^j$ corresponding to the target speed and the target Rician factor under the certain frequency point to acquire a weight vector, i.e., $$(\overline{w}, \hat{w}) = \qquad (5\text{-}1)$$

$$\arg\min_{\overline{w},\hat{w}}(Err) = \arg\min_{\overline{w},\hat{w}} \left( \sum_{j \in B} ((|v_j - f(a^j, \overline{w})|)^2 + \alpha * (|\kappa_j - g(a^j, \hat{w})|)^2) \right),$$

to obtain $\overline{w}$ and $\hat{w}$ respectively in a case where an error is a minimum value, thereby further obtaining the speed prediction model and the Rician factor prediction model corresponding to the set overrunning parameter under the frequency point, where arg min represents a variable value when an objective functions is minimized. In the obtained Rician factor prediction model, the feature vectors are input values, and the Rician factors are output values. Supervised learning of the target speed and the target Rician factor is considered, such that a certain frequency point corresponds to set values of a plurality of overrunning parameters, the different set values of the plurality of overrunning parameters correspond to one speed prediction model and one Rician factor prediction model respectively, and therefore, the frequency points acquired in this embodiment are not in one-to-one correspondence with the speed prediction models, that is, a plurality of speed prediction models correspond to one frequency point, and similarly, a plurality of the Rician factor prediction models correspond to one frequency point.

At operation 125, the primary training data set is traversed to obtain prediction models under all frequency points to form a second model library.

An application range of the model library is wider by obtaining the model library under all the frequency points. That is, the prediction models in the second model library acquired according to error function expression (5) may predict movement speeds or speed types and the Rician factors of a plurality of terminals in different cells.

It needs to be noted that in the process of establishing the first model library or the second model library, the channel data use cases are acquired under a certain Rician factor, such that the obtained prediction model is suitable for mixed scenes having different direct-sight-path proportions, the mixed scenes having different direct-sight-path proportions are more consistent with the actual communication network, and the two model training criteria both use a supervised learning mode training model, so as to make the acquired model more accurate, such that the accuracy of data predicted by the prediction model acquired by means of supervised learning is higher.

In addition, the model library further stores a mapping relation table between frequency points and models, the first model library stores a first mapping relation table between frequency points and models, and the first mapping relation table between the frequency points and the models includes frequency point information, the speed prediction models and corresponding relations between the frequency point information and the speed prediction models. The second model library stores a second mapping relation table between frequency points and models, and the second mapping relation table between the frequency points and the models includes frequency point information, the overrunning parameters, the speed prediction models, the Rician factor prediction models and corresponding relations between the frequency point information, the overrunning parameters, the speed prediction models, and the Rician factor prediction models. After the model library is established, the predetermined prediction model corresponding to the frequency point of the terminal to be measured in the model library may be selected to predict the movement speed or the speed type of the terminal in the cell without establishing the model library once during speed measurement every time. Only one model library (for example, the first model library or the second model library) only needs to be established, and the prediction model in the model library may be used for predicting the movement speed of the terminal.

In an implementation, when the second model library is used, a plurality of speed prediction models and Rician factor prediction models correspond to one frequency point, and the prediction model having optimal performance under the frequency point is selected, which includes:

At operation 130, a Rician factor prediction model is determined from the model library based on the frequency point of the terminal and an initial overrunning parameter.

In this embodiment, if the frequency of the terminal included in the second model library is queried in the second mapping relation table between the frequency points and the models, the Rician factor prediction model having a set value of the initial overrunning parameter of 1 under the frequency point is selected, and therefore, the training model having the set value of the initial overrunning parameter of 1 consider supervised learning of the target speed and the target Rician factor in a balanced mode.

Of course, the Rician factor prediction model having the set value of the initial overrunning parameter of 0.2, 0.5, or other values under the frequency point may be selected, and the set value of the initial overrunning parameter of 1 is preferred in this embodiment.

At operation 131, a Rician factor is predicted based on the first feature vector and the determined Rician factor prediction model.

In this embodiment, the first feature vector constructed based on the channel data of the terminal is substituted into the determined Rician factor prediction model to predict a value of the Rician factor.

At operation 132, a target overrunning parameter is determined based on the predicted Rician factor and a preset mapping relation table between overrunning parameters and Rician factors.

In an implementation, the channel identification method further includes the following operation. A mapping relation table between the overrunning parameters and the Rician factors is constructed, where the mapping relation table between the overrunning parameters and the Rician factors is represented as follows:

$$\alpha = \begin{cases} 0, & \kappa \le 0.25 \\ 0.2, & 0.25 < \kappa \le 0.5 \\ 0.4, & 0.5 < \kappa \le 1 \\ 0.5, & 1 < \kappa \le 3 \\ 0.7, & 3 < \kappa \le 5 \\ 1, & 5 < \kappa \end{cases} \quad (6)$$

where α is the overrunning parameter, and κ is the Rician factor. In this embodiment, if the value of the Rician factor predicted in operation 131 is 0.5, the target overrunning parameter is determined to be 0.2 according to the mapping relation table between the overrunning parameters and the Rician factors. It may be seen from the mapping relation table between the overrunning parameters and the Rician factors that selection of the overrunning parameter is increased along with increase of the Rician factor, that is, an error term proportion of the Rician factor in the model training criteria (error function) is increased along with increase of the Rician factor, and it is reflected that in the actual communication network, when the Rician factor (power proportion of the direct sight path) is large, the influence on the curve of the cross-correlation values changing along with time intervals is correspondingly great.

It needs to be noted that a value of the target overrunning parameter in operation 132 and the value of the initial overrunning parameter in operation 131 do not have a direct relation, and only when the initial overrunning parameter is an optimal set value 1, the first feature vector is input into the Rician factor prediction model corresponding to the initial overrunning parameter which is a set value 1, thereby predicting the Rician factor, and the value of the target overrunning parameter is determined according to the mapping relation table between the overrunning parameters and the Rician factors.

At operation 133, a speed prediction model is determined from the model library based on the frequency point of the terminal and the determined target overrunning parameter.

In this embodiment, a plurality of speed prediction models correspond to the frequency point of the terminal, and one corresponding speed prediction model is determined if the overrunning parameter needs to be determined. For example, the speed prediction model corresponding to the selected target overrunning parameter when the target overrunning parameter is selected to be 0.2 is the speed prediction model having optimal performance under the frequency point. The objective of determining the target overrunning parameter corresponding to the speed prediction model according to the preset mapping relation table between the overrunning parameters and the Rician factors is to select the training criteria having a more reasonable error caused by a direct view path proportion according to a size of the Rician factor. In addition, the model training criteria further consider supervised learning of the speed and the Rician factor in a balanced mode, such that the speed prediction model determined under these conditions is more reasonable and accurate, that is, the prediction model having optimal performance is defined.

In an implementation, before the selecting the prediction model corresponding to the frequency point of the terminal from the model library (the first model library or the second model library), the method further includes:

At operation 140, whether the frequency points in the model library include the frequency point of the terminal is determined, and different channel data use cases under the frequency point of the terminal are acquired in a case where the frequency points in the model library do not include the frequency point of the terminal.

In this embodiment, when the frequency point of the terminal included in the model library is queried in the mapping relation table between the frequency points and the models in a table look-up mode, it is indicated that the channel data use case under the frequency point is not acquired when the model library is established, it is indicated that the channel data use case of the model library is not complete enough, and the model library needs to be further improved. Therefore, based on the system simulation platform, the laboratory channel simulator, etc., the channel data use cases under different target speeds under the frequency point of the terminal are acquired, or the channel data use cases under different target speeds and different target Rician factors under the frequency point of the terminal are acquired.

At operation 141, for data use case of each channel under the frequency point of the terminal, the construction method in operation 102 is used to construct a second feature vector, and a corresponding target speed is recorded, or a corresponding target speed and a corresponding target Rician factor are recoded.

At operation 142, based on error function expression (4) or error function expression (5) in the model training criteria, and the second feature vectors and the corresponding target speed or the second feature vector and the corresponding target speed and the target Rician factor acquired in operation 141, parameters of the prediction model under the frequency point of the terminal are acquired to obtain the prediction model under the frequency point, and the prediction model is added into the corresponding model library. Specifically, if the first model library is established, the channel data use cases at different target speed under the frequency point of the terminal are acquired, and the prediction model obtained based on error function expression (4) is added into the first model library; and if the second model library is established, channel data use cases under different target speeds and different target Rician factors under the frequency point of the terminal are acquired, and the prediction model obtained based on error function expression (5) is added into the second model library, so as to perfect the first model library or the second model library.

It should be noted that the prediction models in the model library include the speed prediction models and the Rician factor prediction models (corresponding to the second model library) or only include the speed prediction models (the first model library) due to different error function expressions. the operations 140-142 of the implementation are used for solving the problem that the model library does not include the frequency point of the terminal to be measured.

In an implementation, the first feature vector is input into the predetermined prediction model to predict the speed of the terminal.

In this embodiment, when one prediction model corresponding to the frequency point of the terminal and serving as the predetermined prediction model is selected (there are two possible cases, one case is that one corresponding prediction model under a certain frequency point is acquired from the first model library, and the other case is that a plurality of corresponding prediction models under a certain frequency point are acquired from the second model library; and the prediction model having optimal performance is selected from a plurality of prediction models), the first feature vector constructed based on the channel data of the terminal is input into the predetermined prediction model to predict the speed of the terminal.

In another implementation, the operation of inputting the first feature vector into the predetermined prediction model to predict the speed type of the cluster to which the terminal belongs includes the following operations.

For the cluster to which terminal belongs, the first feature vector constructed based on the channel data of terminal is inputted into the predetermined prediction models to predict a speed set of the cluster to which terminal belongs, and speed grading and majority voting are used to predict the speed type of the cluster to which terminal belongs.

In this embodiment, the cell terminals may be clustered and divided according to the channel data of terminal or position information to which terminal belongs. For the cluster to which the terminal belongs, the first feature vector constructed based on the channel data of the terminal is input into the corresponding prediction model selected under the frequency point of the terminal: in the first case, the first model library or the second model library is used, and when one predetermined prediction model is provided, a set of speed values of all terminals belonging to the cluster is predicted, and is recorded as a first set; and in the second case, when a plurality of predetermined prediction models are provided by using the second model library, a set of speed values of all terminal of the cluster is predicted and recorded as a second set, where the second set has more data than the first set. Then, speed values in the first set or the second set are ranked (for example, the speed values are divided by intervals, the speed values less than 5 kilometers per hour are set to be a low speed, the speed values greater than 5 kilometers per hour and less than 30 kilometers per hour are set to be a medium speed, and the speed values are greater than 30 kilometers per hour are set to be a high speed), and for speed grades in the first set or the second set, the labels of types are determined in a majority voting or speed mean mode (if the number of the low speeds in the first set is 100, the number of the medium speeds in the first set is 150, and the number of the high speeds in the first set is 50, the labels of the types are determined to be medium speed types in the majority voting mode), it is determined that the cluster to which the terminal belongs is a high-speed type or a medium-speed type or a low-speed type, and the speed type of the terminal and the cluster to which the terminal belongs may be predicted.

It should be noted that the speed type may be three (high speed, medium speed, low speed), four, five, or more, and when the speed type tends to infinity, the predicted speed type of the terminal or the cluster to which the terminal belongs is closer to a determined speed value, i.e. similar to the predicted speed of the terminal or the cluster to which the terminal belongs.

In an implementation, after the predicting the speed of the terminal, the channel identification method further includes:

classify terminal according to the predicted speed of the terminal, use differential scheduling for the classified terminal to compare changes of key performance indicators of the terminal before and after classification, and carry out machine learning in a case where it is determined that the key performance indicator before classification is superior to the key performance indicator after classification.

In this embodiment, the terminal is classified according to the predicted speed of the terminal by using the above exemplary method (speed value grading) to obtain a terminal cluster, and differential scheduling is used for the classified terminal cluster. The change conditions of the key performance indicators (KPIs) of the terminal cluster in the cell before and after classification are compared subsequently, where the KPI may be information of spectrum efficiency (SE), flow, etc. If $KPI_a-KPI_b \geq 0$, the prediction models in the model library (the first model library or the second model library) are kept unchanged, and otherwise, machine learning is started, where $KPI_a$ represents a key performance indicator value of a certain terminal cluster of the cell after classification, and $KPI_b$ represents a key performance indicator value of a certain terminal cluster of the cell before classification. The classified cell terminal cluster is a terminal cluster obtained by classifying the terminal according to the predicted speed, if the key performance indicator value of the cluster formed by the cell terminal cluster before classification is acquired, the cluster formed by the terminal before classification may be found by means of the identifier (ID) of the classified terminal, and the key performance indicator value of the cluster is computed, thereby completing KPI comparison before and after classification.

In an implementation, machine learning includes the following operations.

At operation 150, current channel data of the terminal is acquired.

In this embodiment, the current channel data of the cell terminals is acquired on line, and for example, small-scale data of a user who is making a call or using mobile data is extracted by a base station in a commercial field.

At operation 151, a third feature vector is constructed based on the current channel data (construct a third feature vector according to the channel data of each terminal), where the third feature vector represents a numerical value set of cross-correlation values, which change along with time intervals, between channel data at different moments and the channel data themselves and between the channel data at different moments and subsequent channel data at different time intervals,.

In this embodiment, the third feature vector is constructed in the same mode as the first feature vector. That is, a third feature matrix (the channel data of each terminal correspond to one third feature matrix) is constructed based on current frequency domain data of the cell terminal, where the third feature matrix may be expressed by expression (2), that is, rows of the third feature matrix include expected values of cross-correlation values between frequency domain data of a channel at different moments and the frequency domain data themselves and between the frequency domain channel data at different moments and subsequent frequency domain data at different time intervals. If the acquired current channel data of the cell terminal is the time domain data, the time domain data needs to be converted into the frequency domain data. The third feature vector is constructed according to the above third feature matrix $V_i$, (i=1, 2, . . . , M), the third feature vector may be expressed by expression (3), that is, $\alpha^i=[\alpha_0^i, \alpha_1^i, \ldots, \alpha_N^i]$, and the construction method is as described in operation 102, where $\alpha_t^i$ represents a mean value (t=0, 1, . . . , N) of effective values of the t-th column of the third feature matrix $V_i$.

At operation 152, unsupervised learning is carried out on the third feature vector acquired in operation 151 to obtain a blind classifier.

In this embodiment, the current channel data of the cell terminal acquired on line do not have target values, such that unsupervised learning is carried out on the third feature vector to obtain the blind classifier.

At operation 153, the blind classifier is used to carry out blind classification on the cell terminal based on the current channel data.

In this embodiment, unsupervised learning is carried out on the third feature vector constructed based on the current channel data of the cell terminal acquired on line to obtain the blind classifier. For example, a K-Mean algorithm is utilized to acquire P clusters as follows:

$$\{(C_i, \Theta_i)|i=1, 2, \ldots, p\} \quad (7)$$

where $C_i$, $\Theta_i$ represents a center of the i-th cluster, and a set composed of indexes of the third feature vector belonging to the i-th cluster, and a center point of each cluster serves as a classification model to obtain the cluster to which the terminal belongs. Of course, other algorithms of a K-MEDOIDS algorithm, a CLARANS algorithm, an Apriori algorithm, etc. may be used, or other blind classifiers of decision trees, integrating models, etc., may be used.

At operation 154, based on the speed prediction model of the cell terminal under the current frequency point in the model library, a speed type of the cluster to which the cell terminal belongs after blind classification is determined.

In the embodiment, the terminal is classified according to the predicted speed, differential scheduling is used for the classified terminal, and the KPI of the classified terminal is worse than the KPI of terminal before classification, which indicates that the speed predicted by using the prediction model is inappropriate, and therefore, the channel data of the cell terminal acquired on line is used for machine learning to obtain the speed type of the cluster to which the cell terminal belongs, which serves as a remedy method for user channel identification.

In an implementation, the channel data of the terminal are acquired; the first feature vector is constructed based on the channel data of the terminal; blind classification is carried out on the terminal according to the first feature vector constructed by the channel data of the terminal to obtain the cluster to which the terminal belongs; and the first feature vector constructed based on the channel data of the terminal is input into the predetermined prediction model to predict the speed type of the cluster to which the terminal belongs. The prediction model corresponding to the frequency point of the terminal is selected from the model library to serve as the predetermined prediction models.

Embodiment 2

Figure 4:
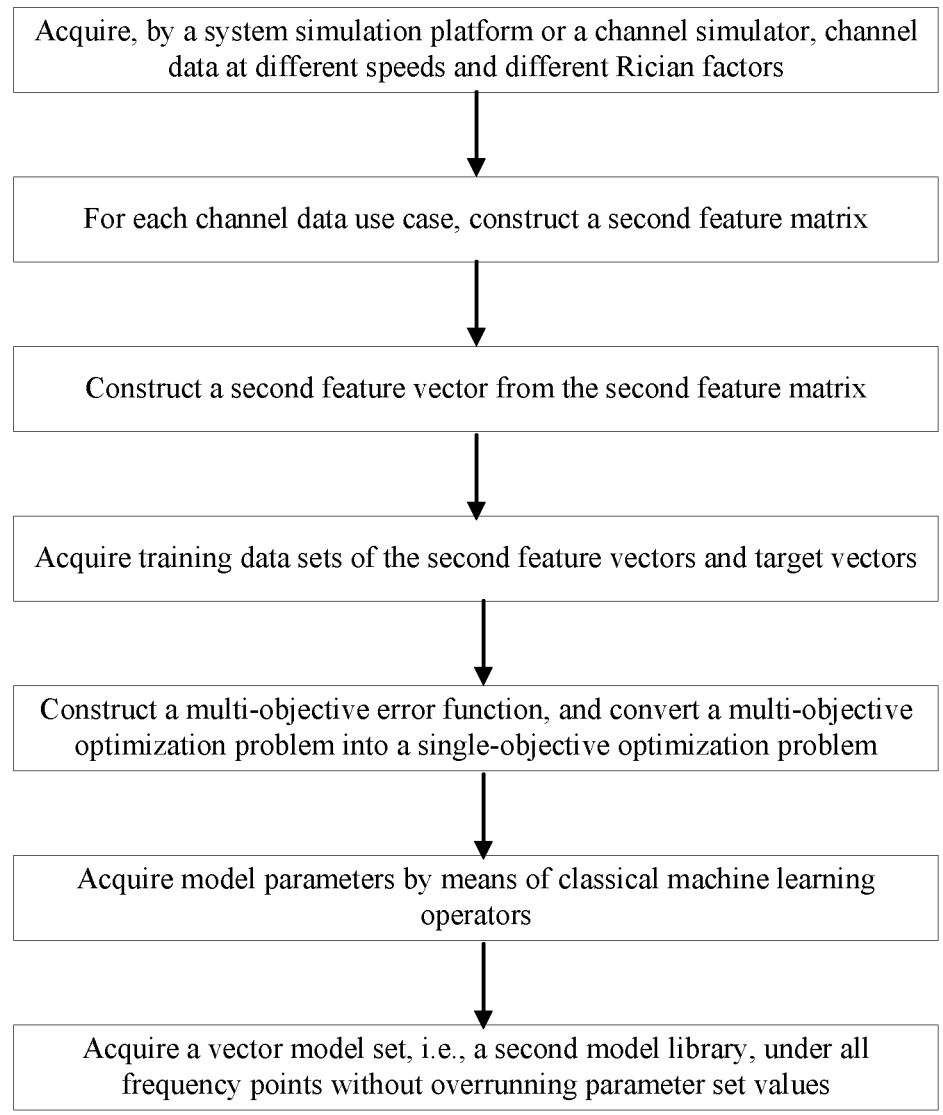
FIG. 4 is a flow chart of a channel identification method of an embodiment of the present disclosure.

This embodiment provides a channel identification method. As shown in FIG. 4, the method includes:

At operation 1, channel data $H=\{[h_0, h_1, h_2, \ldots, h_N]_i|i=1, 2, \ldots, M\}$ of channel use cases under different speeds and different Rician factors is acquired based on a system simulation platform, a laboratory channel simulator or an outfield commercial scene having configurable channel parameters, and the corresponding targets are as follows: $H_{tar}=\{[v_i, \kappa_i]|i=1, 2, \ldots, M\}$, where $[h_0, h_1, h_2, \ldots, h_N]_i$ represents real data of channel data, aligned in a frequency domain, of the i-th use case in N continuous subframes; $[v_i, \kappa_i]$ represents a target vector of the i-th use case, which corresponds to speed information and Rician factor (direct sight path power ratio) information respectively, and frequency point information $f_c$ corresponding to the channel is recorded. In consideration of actual cases and comprehensiveness of sample data, channel data corresponding to common frequency point information is generally acquired under each target speed, that is, channel data corresponding to a plurality of pieces of frequency point information are acquired under one target speed.

At operation 2, a second feature matrix is constructed according to channel data of the i-th channel use case (i=1, 2, ..., M), i.e., $$V_i = \begin{bmatrix} E(h_0*h_0^H), & E(h_0*h_1^H), & E(h_0*h_2^H), & \ldots, & E(h_0*h_{N-1}^H), & E(h_0*h_N^H) \\ E(h_0*h_1^H), & E(h_1*h_2^H), & E(h_1*h_3^H), & \ldots, & E(h_1*h_N^H), & Null \\ E(h_2*h_2^H), & E(h_2*h_3^H), & E(h_2*h_4^H), & \ldots, & Null, & Null \\ \vdots & & & \ddots & & \vdots \\ E(h_{N-1}*h_{N-1}^H), & E(h_{N-1}*h_N^H), & Null, & \ldots, & Null, & Null \\ E(h_N*h_N^H) & , Null & Null, & \ldots, & Null, & Null \end{bmatrix}_i \quad (2)$$

$$i=1, 2, \cdots, M,$$

where $h_o^H$ is a conjugate of $h_0$, correspondingly, $h_N^H$ is a conjugate of $h_N$, $(h_o*h_0^H)$ represents multiplication of two scalars, E represents an expected value or a mean value, and Null represents null or an invalid value. Each row of the second feature matrix represents expected values or mean values of cross-correlation values between channel data at different moments and the channel data themselves and between the channel data at different moments and subsequent data at different time intervals.

At operation 3, second feature vector $\alpha^i=[\alpha_0^i, \alpha_1^i, \ldots, \alpha_N^i]$ is constructed according to the above second feature matrix $V_i$, (i=1, 2, ..., M), where $\alpha_t^i$ represents a mean value (t=1, 2, ..., N) of effective values of the t-th column of the second feature matrix $V_i$; and a set of the second feature vectors and target vectors is acquired as follows:

$$A=\{(\alpha^i, \alpha_{tar}^i)|i=1, 2, \ldots, M\}, \alpha_{tar}^i=[v_i, \kappa_i]$$

where the set constitutes a training data set, where $[v_i, \kappa_i]$ represents a target rate and a Rician factor corresponding to the second feature vector of the i-th use case.

At operation 4, model training is carried out in a following manner. At operation 4.1, a data set corresponding to a certain frequency point is selected from constructed data $A=\{(\alpha^i, \alpha_{tar}^i)|i=1, 2, \ldots, M\}$ (the data set includes a plurality of different second feature vectors under the same frequency point) according to frequency point information corresponding to frequency domain data: $T=\{(\alpha^j, \alpha_{tar}^j) |j \in B\}$, where T represents a subset of A, B represents a data index set corresponding to frequency points, and j is a variable in B.

At operation 4.2, an error function is constructed. A multi-objective error function is constructed, and a multi-objective optimization problem is converted into a single-objective optimization problem by introducing overrunning parameters, where $$Err = \sum_{j \in B}((|v_j - f(\alpha^j, \overline{w})|)^2 + \alpha * (|\kappa_j - g(\alpha^j, \hat{w})|)^2), \quad (5)$$

where $f(\bullet, \overline{w})$ and $g(\bullet, \hat{w})$ may represent a linear regression, or a neural network, etc., and the weight $(\overline{w}, \hat{w})$ may correspond to a weight value corresponding to a linear regression weight or a neural network; $v_j$ represents a target speed corresponding to the second feature vector $\alpha^j$, $\kappa_j$ represents a target Rician factor corresponding to the second feature vector $\alpha^j$, $f(\alpha^j, \overline{w})$ represents a speed prediction model, $g(\alpha^j, \hat{w})$ represent a Rician factor prediction model, $\alpha$ is an overrunning parameter (compromise factor), B represents a data index set corresponding to the frequency points, and j is a variable in B.

At operation 4.3, according to different set values of the overrunning parameter $\alpha$, model parameters are acquired by means of classical model training operators (for example, operators of a regression algorithm, a neural network, a support vector machine, etc.), which is equivalent to determining the speed prediction model and the Rician factor prediction model, that is, a model set $\{(f, g)_k | k \in \Omega\}$ under different set values of the overrunning parameter $\alpha$ under a certain frequency point is acquired, and the model set is stored, where f represents the speed prediction model related to the feature vector, g represents the Rician factor prediction model related to the feature vector, and $\Omega$ is a value set of $\alpha$. The operation aims to obtain a set of the speed prediction models and the Rician factor prediction models under different set values of the overrunning parameter at a certain frequency point.

At operation 4.4, it is determined whether traverse of the corresponding frequency points in all the training data sets A is completed, and if the traverse is not completed, continue executing operation 4.1; and if the traverse is completed, the model set $\{(f, g)_k^l | l \in \Gamma, k \in \Omega\}$ is acquired, where $\Gamma$ is a frequency point set, and $\Omega$ is a set value set of the overrunning parameter $\alpha$. The step aims to obtain a set of vector models under different set values of the overrunning parameter under all frequency points, that is, a second model library is obtained, the second model library stores a third mapping relation table between the frequency points and the vector models, and the third mapping relation table between the frequency points and the vector models include the frequency points, the overrunning parameters, the vector models, and corresponding relations between the frequency points, the overrunning parameters and the vector models, where the vector models include the speed prediction models and the Rician factor prediction models.

At operation 5, model application is carried out in the following manner.

At operation 5.1, it is determined whether the working frequency point of the terminal to be measured exists in the second model library. Specifically, determination is carried out in a table look-up mode, and for example, matching look-up is carried out in the third mapping relation table between the frequency points and the vector models according to the frequency point of the terminal to be measured. If the working frequency point of the terminal to be measured is found in the third mapping relation table, a vector model having the $\alpha$ set value of the overrunning parameter of 1 is selected under the frequency point and is recorded as a first vector model (that is, the vector model (f, g) having the set value of the overrunning parameter of 1 under the current working frequency point is selected from the model library).

If the working frequency point of the terminal to be measured is not found in the frequency point set, operation 5.4 is executed.

At operation 5.2, a Rician factor prediction model is selected from the first vector model (f, g) as a second prediction model which is represented as g. According to the first feature vector constructed by current channel information of the terminal, the first feature vector is substituted into the second prediction model g, and a Rician factor corresponding to the current channel is predicted, that is, a value of the Rician factor is acquired.

At operation 5.3, a preset mapping relation table between the overrunning parameters and the Rician factors is constructed. A construction principle of the mapping relation table is as follows: the overrunning parameter is increased along with increase of the Rician factor, that is, along with increase of the Rician factor, an error term proportion of the Rician factor in training criteria (in an error function) of the model is increased.

The expression is:

$$\alpha = \begin{cases} 0, & \kappa \leq 0.25 \\ 0.2, & 0.25 < \kappa \leq 0.5 \\ 0.4, & 0.5 < \kappa \leq 1 \\ 0.5, & 1 < \kappa \leq 3 \\ 0.7, & 3 < \kappa \leq 5 \\ 1, & 5 < \kappa \end{cases}, \quad (6)$$

where $\alpha$ is the overrunning parameter, and $\kappa$ is the Rician factor. According to the preset mapping relation table between the overrunning parameters and the Rician factors, a target overrunning parameter $\alpha$ corresponding to the value of the Rician factor obtained in operation 5.2 is determined, and then the speed prediction model f corresponding to the target overrunning parameter $\alpha$ is looked up in the third mapping relation table between the frequency points and the vector models, and the first feature vector constructed according to the current channel data of the terminal is substituted into the speed prediction model f to predict a movement speed of the terminal, and then operation 6 is executed. According to the predicted Rician factor and the preset mapping relation table between the overrunning parameters and the Rician factors, the target overrunning parameter is determined, thereby determining the speed prediction model, the objective of which is that according to the size of the Rician factor, the error caused by a direct view diameter proportion is selected to be reasonable training criteria; and supervised learning of the speed and the Rician factor is considered in a balanced mode in the error function, such that the speed prediction model determined under these conditions is more reasonable and accurate.

At operation 5.4, channel data of the terminal to be measured under the current frequency point is acquired on a system simulation platform or a laboratory channel simulator, channel data of a plurality of target speeds and a plurality of target Rician factors under the frequency point is acquired, models are trained and a model library is perfected according to operations 1-3, and then operations 5.1-5.3 are executed to complete speed prediction.

At operation 6, model evaluation is carried out in a following manner.

According to the speed predicted in operation 5, the terminal is classified, and differential scheduling, resource allocation and transmission modes are used for different types of terminals. For example, according to the predicted speed value, division is carried out according to intervals, for example, the speed values less than 5 kilometers per hour are a low-speed group, the speed values greater than 5 kilometers per hour and less than 30 kilometers per hour are a medium-speed group, and the speed values greater than 30 kilometers per hour are a high-speed group; time-varying properties of different speed group channels are different, such that the urgency degree of channel detection is different; for example, sparse degrees of reference signal resources for channel detection of different speed groups are different, and processing is carried out according to a principle that the low-speed group is sparse to the medium-speed group and the medium-speed group is sparse to the high-speed group such that the spectrum efficiency may be improved; and for another example, for a medium-high speed mobile terminal, a base station may use a wide beam to serve the base station, and for a low-speed mobile terminal, the base station may use a narrow beam to serve the terminal.

The model is evaluated in a mode of comparing a change of a KPI of a terminal cluster corresponding to a cell before and after classification, and the KPI may be information of SE, flow, etc. If $KPI_a - KPI_b \geq 0$, the speed prediction model is kept unchanged, otherwise, machine learning is started, and operation 7 is executed, where $KPI_a$ represents a KPI value of a certain terminal cluster of the cell after classification, and $KPI_b$ represents a KPI value of a certain terminal cluster of the cell before classification. The classified cell terminal cluster is a terminal cluster obtained by classifying the terminal according to the predicted speed, if the KPI value of the cell terminal cluster before classification is obtained, the terminal cluster formed before classification of the terminal may be found by means of an ID of each classified terminal, and the KPI value of the cluster before classification is computed, thereby completing KPI comparison before and after classification.

At operation 7, machine learning is carried out, where the machine learning includes online learning which is described in detail below.

At operation 7.1, current channel information of a cell terminal is extracted on line (for example, channel information of a user who is making a call or using mobile data is extracted by a base station in a commercial field); and a third feature vector is constructed according to a construction method the same as in operations 2 and 3 to obtain a third feature vector set of the following form:

$$T = \{\alpha^j | j \in S\}$$

where S is an index set of the third feature vector, and j is a variable in S. At operation 7.2, unsupervised learning is carried out on the third feature vector to obtain a blind classifier.

For example, a K-mean algorithm is utilized to obtain p clusters as follows:

$$\{(C_i, \Theta_i) | i = 1, 2, \ldots, p\} \quad (7),$$

where $C_i$, $\Theta_i$ represents a center of the i-th cluster and a set composed of indexes of the third feature vectors belonging to the i-th cluster, and a center point of each cluster serves as a classification model.

At operation 7.3, blind classification is carried out, by using the blind classifier, on the terminal according to the channel information of the terminal. For each type of terminal, a label of the type is determined in a majority voting or speed mean value mode by using a speed prediction model set under a current frequency point, for example, the label of the type may be one of a high-speed type, a medium-speed type and a low-speed type.

This process is described in detail below.

(1) According to frequency point information of the cell terminal, the speed prediction model set $\{f_k | k \in \Omega\}$ corresponding to the current frequency point may be selected from a model library database $\{(f, g)_k^l | l \in \Gamma, k \in \Omega\}$ obtained in operation 4.4, where the cell works under only one working frequency point.

(2) The speed prediction model set $\{f_k | k \in \Omega\}$ is utilized to carry out speed prediction on each third feature vector in $\Theta_i$ to obtain a speed set $\{v_{i,k,m} | k \in \Omega, m \in \Theta_i\}$ of the i-th cluster, thereby determining a speed type of the i-th cluster by means of speed classification and majority voting. For example, according to the speed grade classification standard in operation 6, the data in the speed set obtained by means of prediction is classified into a high-speed group, a medium-speed group and a low-speed group, the number of speed values in each classified group is counted, the speed type of the i-th cluster is determined in a majority voting mode, and if the statistical number of the high-speed group is 200, the statistical number of the medium-speed group is 100, and the statistical number of the low-speed group is 150, it is determined that the high-speed group is the speed type of the i-th cluster, i.e., it is defined that the terminals in the i-th cluster are all high-speed mobile terminals.

At operation 7.4, for different terminal types, differential scheduling, resource allocation and transmission modes are used to compare KPI performance changes, for example, flow, SE, time delay, etc., of the terminal cluster corresponding to the cell before and after classification, and if $KPI_a - KPI_b \geq 0$, keep the speed prediction model unchanged.

Although the machine learning in operation 7 may not predict the specific speed values of terminal, the machine learning may predict the speed type of terminal, and the speed type are not limited to three types and may be four, five or more speed types, such that on-line learning may predict the more accurate speed types of terminal as long as the speed type tends to infinity, and the specific speed value of the predicted terminal may be approximated.

Embodiment 3

This embodiment provides a channel identification method, including the following operations.

At operations 1-4, the operations same as described in Embodiment 2 are performed.

At operation 5, machine learning is carried out in the following manner.

At operation 5.1, current channel information of a terminal is extracted on line (for example, channel information of a user who is making a call or using mobile data is extracted by a base station in a commercial field); and a first feature vector is constructed according to the same method as in operations 2 and 3, so as to obtain a first feature vector set of the following form:

$$T = \{\alpha^j | j \in S\}$$

where S is an index set of the first feature vector, and j is a variable in S.

At operation 5.2, unsupervised learning is carried out on the first feature vector to obtain a blind classifier.

For example, a K-Mean algorithm is utilized to obtain p clusters as follows:

$$\{(C_i, \Theta_i) | i = 1, 2, \ldots, p\} \quad (7),$$

where $C_i$, $\Theta_i$ represents a center of the i-th cluster, and a set composed of indexes of the first feature vectors belonging to the i-th cluster respectively, and a center point of each cluster serves as a classification model.

At operation 5.3, blind classification is carried out on the terminal by using the blind classifier according to the channel information of the terminal, and for each type of terminal, the label of the type is determined according to the speed prediction model under a current frequency point by using a majority voting or speed mean value mode, wherein the label of the type is one of a high-speed type, a medium-speed type and a low-speed type.

At operation 5.4, for different terminal types, differential scheduling, resource allocation and transmission modes are used to compare KPI performance changes, for example, flow, SE, time delay, etc., of the terminal cluster corresponding to the cell before and after classification, and if $KPI_a - KPI_b \geq 0$, the speed prediction model is kept unchanged.

According to the above embodiment, the first feature vector constructed according to the channel data of the terminal to be measured is input into the predetermined prediction model, thereby accurately predicting the movement speed or the movement speed type of the terminal, and the first feature vector represents a numerical value set of cross-correlation values, which change along with time intervals, between channel data at different moments and the channel data themselves and between the channel data at different moments and subsequent channel data at different time intervals. If a curve formed by the numerical value set is different, the speed is different, and computation of the first feature vector is computation of the speed. Moreover, corresponding channel data under various target speeds is acquired based on a network channel model, and the second feature vector is constructed for the channel data, and is used for describing the numerical value set, which changes along with correlation time intervals, of cross-correlation values of a channel under a certain speed under a certain frequency point, thereby forming the model training data set by the second feature vector and the target speed. The model training criteria are constructed and a supervised learning and classical learning algorithm is used to determine model parameters, thereby obtaining the corresponding speed prediction model under the frequency point as the predetermined speed prediction model. The first feature vector constructed based on the channel data of terminal to be measured is input into the speed prediction model under the corresponding frequency point to acquire the prediction speed of the terminal or the speed type of the cluster to which the terminal belongs. The acquired training data set includes data in a mixed scene with different direct view path ratios, and the constructed model training criteria are based on supervised learning, such that the acquired speed prediction model is closer to an actual communication network, and accuracy of the speed predicted according to the speed prediction model is higher, and the speed prediction accuracy is higher, thereby solving the problem of low accuracy of high-resolution speed measurement, and finally, achieving accurate classification of the channel. In addition, classification may further be carried out according to the speed predicted by the terminal to be measured, and differential scheduling, resource allocation or transmission modes is used for the classified the terminal, thereby improving frequency spectrum efficiency of the cells, and improving user experience.

Embodiment 4

This embodiment provides an adaptive transmission method, used for carrying out adaptive transmission according to a speed of a terminal or a speed type of a cluster to which the terminal belongs, which is obtained by the method of Embodiment 1.

Embodiment 5

Figure 5:
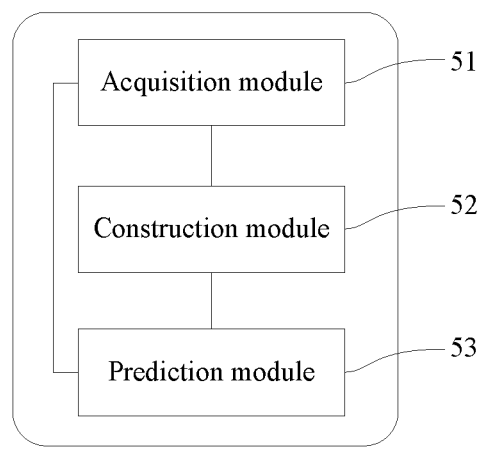
FIG. 5 is a structural schematic diagram of a channel identification apparatus of an embodiment of the present disclosure.

As shown in FIG. 5, this embodiment provides a channel identification apparatus, including: an acquisition module 51, a construction module 52 and a prediction module 53, where the acquisition module 51 is configured to acquire channel data of a terminal;

the construction module 52 is coupled to the acquisition module 51, and is configured to construct a first feature vector based on the channel data acquired by the acquisition module 51, where the first feature vector represents a numerical value set of cross-correlation values, which change along with time intervals, between channel data at different moments and the channel data themselves and between the channel data at different moments and subsequent channel data at different time intervals; and the prediction module 53 is coupled to the construction module 52 and is configured to input the first feature vector constructed by the construction module 52 into a predetermined prediction model to predict a speed of the terminal, or predict a speed type of a cluster to which the terminal belongs.

In this embodiment, the prediction module 53 is further coupled to the acquisition module 51, and is configured to select a prediction model corresponding to frequency points in the construction module 52 according to frequency point information in the acquisition module 51 to serve as a predetermined prediction model. The prediction module further stores a model library, and the prediction module is configured to acquire the prediction model in the model library from an external device.

In an implementation, the construction module includes a matrix construction unit and a vector construction unit, where the matrix construction unit is coupled to the acquisition module and is configured to construct the first feature matrix based on the channel data acquired by the acquisition module, where each row of the first features matrix includes expected values of cross-correlation values between frequency domain channel data at different moments and the frequency domain data themselves and between the frequency domain channel data at different moments and subsequent frequency domain channel data at different time intervals; and the vector construction unit is coupled to the matrix construction unit and is configured to compute a mean value of effective values of each column of the first feature matrix in the matrix construction unit as a row value of the first feature vector, so as to obtain the first feature vector.

Embodiment 6

This embodiment provides an adaptive transmission device, including the channel identification apparatus of Embodiment 5, and a transmission apparatus, where the transmission apparatus is configured to carry out adaptive transmission according to a speed of a terminal or a speed type of a cluster to which the terminal belongs, which is obtained by the channel identification apparatus.

Embodiment 7

Figure 6:
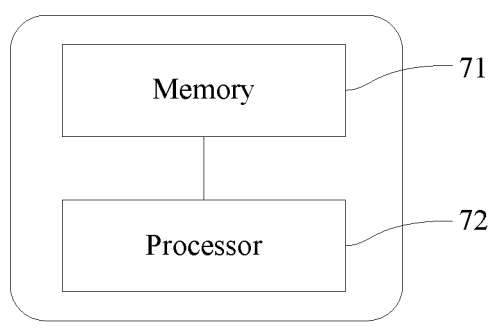
FIG. 6 is a structural schematic diagram of a base station of an embodiment of the present disclosure.

As shown in FIG. 6, this embodiment provides a base station, including a memory 71 and a processor 72, where the memory 1 stores an instruction, and the processor 72 runs the instruction to execute the method of Embodiment 1.

Embodiment 8

This embodiment provides a computer-readable storage medium, storing a computer program, where the computer program, when executed, implements the method of Embodiment 1.

It may be understood by those having ordinary skill in the art that all or some of the operations and functional modules/units in the system and the apparatus disclosed above may be implemented as software, firmware, hardware and appropriate combinations thereof. In an implementation mode of the hardware, division between the functional modules/units mentioned in the above description does not necessarily correspond to division of physical assemblies. For example, a physical assembly may have a plurality of functions, or a function or an operation may be cooperatively executed by several physical assemblies. Some or all of the physical assemblies may be implementable as software executed by a processor, such as a central processing unit, a digital signal processor, or a microprocessor, or as hardware, or as an integrated circuit, such as an application specific integrated circuit. Such software may be distributed on the computer-readable medium, which may include a computer storage medium (or a non-transitory medium) and a communication medium (or a transitory medium). As well known to those having ordinary skill in the art, the term computer storage medium includes volatile, nonvolatile, removable and non-removable media implemented in any method or technology for storing information (such as a computer readable instruction, a data structure, a program module or other data). The computer storage medium includes, but not limited to, a random access memory (RAM), a read only memory (ROM), an electrically erasable programmable read-only memory (EEPROM), a flash memory or other memory technologies, a compact disc read-only memory (CD-ROM), a digital versatile disc (DVD) or other optical disk storages, magnetic cassettes, magnetic tapes, magnetic disk storages or other magnetic storage apparatuses, or any other medium that may be used to store desired information and may be accessed by computers. Furthermore, it is well known to those having ordinary skill in the art that the communication medium typically includes the computer readable instruction, the data structure, the program module or other data in, for example, a carrier wave or a modulated data signal of other transmission mechanisms, and may include any information delivery medium.

It is to be understood that the above implementations are merely exemplary embodiments used for the purpose of illustrating the principles of the present disclosure, and however, the present disclosure is not limited thereto. Those having ordinary skill in the art may make several transformations and improvements without deviating from the spirit and essence of the present disclosure, and these transformations and improvements shall fall within the scope of protection of the present disclosure.

What is claimed is:

1. A channel identification method, comprising:
acquiring channel data of a terminal;
constructing a first feature vector based on the channel data, wherein the first feature vector represents a numerical value set of cross-correlation values, which change along with time intervals, between channel data at different moments and the channel data themselves and between the channel data at different moments and subsequent channel data at different time intervals; and
inputting the first feature vector into a predetermined prediction model to predict a speed of the terminal, or to predict a speed type of a cluster to which the terminal belongs;
wherein before inputting the first feature vector into the predetermined prediction model, the method further comprises:
establishing a model library, wherein the model library stores prediction models under different frequency points; and
selecting a prediction model corresponding to a frequency point of the terminal from the model library as the predetermined prediction model.

2. The method according to claim 1, wherein constructing the first feature vector based on the channel data comprises:
constructing a first feature matrix based on frequency domain data of each piece of channel data, wherein each row of the first feature matrix comprises expected values of cross-correlation values between frequency domain data of a channel at different moments and the frequency domain data themselves and between the frequency domain channel data at different moments and subsequent frequency domain data at different time intervals; and
computing a mean value of effective values of each column of the first feature matrix as a row value of the first feature vector to obtain the first feature vector.

3. The method according to claim 1, wherein establishing the model library comprises:
acquiring different channel data use cases;
for each channel data use case, constructing a second feature vector to obtain a primary training data set, wherein the second feature vector represents a numerical value set of cross-correlation values, which change along with time intervals, between channel data at different moments and the channel data themselves and between the channel data at different moments and subsequent channel data at different time intervals, and the primary training data set is a set comprising second feature vectors under all frequency points and target vectors corresponding to the second feature vectors;
selecting a second feature vector under a frequency point and a target vector corresponding to the second feature vector from the primary training data set to obtain a secondary training data set;
constructing model training criteria;
acquiring parameters of the prediction model under the frequency point based on the model training criteria and the secondary training data set so as to obtain the prediction model under the frequency point; and
traversing the primary training data set to obtain the prediction models under all the frequency points to form the model library.

4. The method according to claim 3, wherein before selecting the prediction model corresponding to the frequency point of the terminal from the model library, the method further comprises:
determining whether the frequency points in the model library comprise the frequency point of the terminal, and acquiring different channel data use cases under the frequency point of the terminal in a case where the frequency points in the model library do not comprise the frequency point of the terminal;

for each channel data use case under the frequency point of the terminal, constructing the second feature vector and recording the corresponding target vector; and acquiring the parameters of the prediction model under the frequency point of the terminal based on the model training criteria, the second feature vector and the corresponding target vector so as to obtain the prediction model under the frequency point of the terminal, and adding the prediction model under the frequency point of the terminal into the model library.

5. The method according to claim 3, wherein in a case where the target vectors comprise target speeds, acquiring the different channel data use cases comprises: acquiring the channel data use cases under different target speeds;

constructing the model training criteria comprises: establishing an expression for an error function:

$$Err = \sum_{j \in B}(|v_j - f(a^j, \overline{w})|)^2$$

wherein Err is an error, $v_j$ is the target speed, $\alpha^j$ is the second feature vector, $f(\alpha^j, \overline{w})$ is a speed prediction model, $\overline{w}$ is a weight parameter, B represents a data index set corresponding to the frequency points, and j is a variable in B; and acquiring the parameters of the prediction model under the frequency point based on the model training criteria and the secondary training data sets so as to obtain the prediction model under the frequency point comprises:

inputting the target speed into the error function, and substituting the second feature vector $\alpha^j$ corresponding to the target speed under the frequency point, to obtain $\overline{w}$ in a case where the error is a minimum value, so as to obtain the speed prediction model under the frequency point.

6. The method according to claim 3, wherein in a case where the target vectors comprise target speeds and target Rician factors, acquiring the different channel data use cases comprises: acquiring the channel data use cases under different target speeds and different target Rician factors;

constructing the model training criteria comprises: establishing an expression for an error function:

$$Err = \sum_{j \in B}((|v_j - f(a^j, \overline{w})|)^2 + \alpha * (|\kappa_j - g(a^j, \hat{w})|)^2)$$

wherein Err is an error, $v_j$ is the target speed, $\kappa_j$ is the target Rician factor, $\alpha^j$ is the second feature vector, $f(\alpha^j, \overline{w})$ is a speed prediction model, $g(\alpha^j, \hat{w})$ is a Rician factor prediction model, $\alpha$ is an overrunning parameter, $0 \leq \alpha \leq 1$, $\overline{w}$ and $\hat{w}$ are weight parameters, B represents a data index set corresponding to the frequency points, and j is a variable in B; and acquiring the parameters of the prediction model under the frequency point based on the model training criteria and the secondary training data sets so as to obtain the prediction model under the frequency point comprises:

inputting the target speed, the target Rician factor and the set overrunning parameter into the error function, and substituting the second feature vector $\alpha^j$ corresponding to the target speed and the target Rician factor under the frequency point, to obtain $\overline{w}$ and $\hat{w}$ respectively in a case where the error is a minimum value, so as to obtain the speed prediction model and the Rician factor prediction model corresponding to the set overrunning parameter under the frequency point.

7. The method according to claim 6, wherein before inputting the first feature vector into the predetermined prediction model to predict the speed of the terminal, the method further comprises:

determining the Rician factor prediction model from the model library based on the frequency point of the terminal and an initial overrunning parameter;

predicting a Rician factor based on the first feature vector and the determined Rician factor prediction model;

determining a target overrunning parameter based on the predicted Rician factor and a mapping relation table between preset overrunning parameters and Rician factors; and determining the speed prediction model from the model library based on the frequency point of the terminal and the determined target overrunning parameter.

8. The method according to claim 7, wherein before determining the target overrunning parameter based on the predicted Rician factor and the mapping relation table between the preset overrunning parameters and the Rician factors, the method further comprises: constructing the mapping relation table between the overrunning parameters and the Rician factors, wherein the mapping relation table between the overrunning parameters and the Rician factors comprises:

$$\alpha = \begin{cases} 0, & \kappa \leq 0.25 \\ 0.2, & 0.25 < \kappa \leq 0.5 \\ 0.4, & 0.5 < \kappa \leq 1 \\ 0.5, & 1 < \kappa \leq 3 \\ 0.7, & 3 < \kappa \leq 5 \\ 1, & 5 < \kappa \end{cases}$$

wherein $\alpha$ is the overrunning parameter, and $\kappa$ is the Rician factor.

9. The method according to claim 5, wherein after inputting the first feature vector into the predetermined prediction model to predict the speed of the terminal, the method further comprises:

classifying the terminal according to the predicted speed of the terminal, using differential scheduling for the classified terminal, comparing changes of key performance indicators of the terminal before and after classification, and carrying out machine learning in a case where it is determined that the key performance indicators before classification are superior to the key performance indicators after classification.

10. The method according to claim 9, wherein carrying out the machine learning comprises:

acquiring current channel data of the terminal;

constructing a third feature vector based on the current channel data, wherein the third feature vector represents a numerical value set of cross-correlation values, which change along with time intervals, between channel data of the terminal at different moments and the channel data themselves and between the channel data of the terminal at different moments and subsequent channel data at different time intervals at a current moment;

carrying out unsupervised learning on the third feature vector to obtain a blind classifier;

using the blind classifier to carry out blind classification on the terminal based on the current channel data; and determining a speed type of the terminal after blind classification based on the speed prediction model for the terminal under a current frequency point in the model library.

11. The method according to claim 1, wherein before inputting the first feature vector into the predetermined prediction model to predict the speed type of the cluster to which the terminal belongs, the method further comprises:

carrying out blind classification on the terminal according to the first feature vector to obtain the cluster to which the terminal belongs; and inputting the first feature vector into the predetermined prediction model to predict the speed type of the cluster to which the terminal belongs comprises:

for the cluster to which the terminal belongs, inputting the first feature vector into the predetermined prediction model to predict a speed set of the cluster to which the terminal belongs, and using speed grading and majority voting to predict the speed type of the cluster to which the terminal belongs.

12. An adaptive transmission method, used for carrying out adaptive transmission according to a speed of a terminal or a speed type of a cluster to which the terminal belongs, which is obtained by a channel identification method, wherein the channel identification method comprises:

acquiring channel data of the terminal;

constructing a first feature vector based on the channel data, wherein the first feature vector represents a numerical value set of cross-correlation values, which change along with time intervals, between channel data at different moments and the channel data themselves and between the channel data at different moments and subsequent channel data at different time intervals; and inputting the first feature vector into a predetermined prediction model to predict the speed of the terminal, or to predict the speed type of the cluster to which the terminal belongs;

wherein before inputting the first feature vector into the predetermined prediction model, the method further comprises:

establishing a model library, wherein the model library stores prediction models under different frequency points; and selecting a prediction model corresponding to a frequency point of the terminal from the model library as the predetermined prediction model.

13. A channel identification apparatus, comprising a memory storing instructions and a processor in communication with the memory, wherein the processor is configured to execute the instructions to:

acquire channel data of a terminal;

construct a first feature vector based on the channel data acquired by the acquisition module, wherein the first feature vector represents a numerical value set of cross-correlation values, which change along with time intervals, between channel data at different moments and the channel data themselves and between the channel data at different moments and subsequent channel data at different time intervals; and input the first feature vector constructed by the construction module into a predetermined prediction model to predict a speed of the terminal, or to predict a speed type of a cluster to which the terminal belongs;

wherein before inputting the first feature vector into the predetermined prediction model, the processor is further configured to execute the instructions to:

establishing a model library. wherein the model library stores prediction models under different frequency points; and selecting a prediction model corresponding to a frequency point of the terminal from the model library as the predetermined prediction model.

14. An adaptive transmission device, comprising the channel identification apparatus of claim 13, and a transmission apparatus, wherein the transmission apparatus is configured to carry out adaptive transmission according to the speed of the terminal or the speed type of the cluster to which the terminal belongs, which is obtained by the channel identification apparatus.

15. A base station, comprising a memory and a processor, wherein the memory stores an instruction, and the processor runs the instruction to execute the method of claim 1.

16. A non-transitory computer-readable storage medium, storing a computer program, wherein the computer program implements the method of claim 1 when executed.

17. The method according to claim 6, wherein after inputting the first feature vector into the predetermined prediction model to predict the speed of the terminal, the method further comprises:

classifying the terminal according to the predicted speed of the terminal, using differential scheduling for the classified terminal, comparing changes of key performance indicators of the terminal before and after classification, and carrying out machine learning in a case where it is determined that the key performance indicators before classification are superior to the key performance indicators after classification.

18. The method according to claim 17, wherein carrying out the machine learning comprises:

acquiring current channel data of the terminal;

constructing a third feature vector based on the current channel data, wherein the third feature vector represents a numerical value set of cross-correlation values, which change along with time intervals, between channel data of the terminal at different moments and the channel data themselves and between the channel data of the terminal at different moments and subsequent channel data at different time intervals at a current moment;

carrying out unsupervised learning on the third feature vector to obtain a blind classifier;

using the blind classifier to carry out blind classification on the terminal based on the current channel data; and determining a speed type of the terminal after blind classification based on the speed prediction model for the terminal under a current frequency point in the model library.

19. A base station, comprising a memory and a processor, wherein the memory stores an instruction, and the processor runs the instruction to execute the method of claim 12.

* * * * *